(12) United States Patent
Sasaki et al.

(10) Patent No.: US 10,570,962 B2
(45) Date of Patent: Feb. 25, 2020

(54) SEALED BEARING

(71) Applicant: NTN CORPORATION, Osaka (JP)

(72) Inventors: Katsuaki Sasaki, Shizuoka (JP); Tomohiro Sugai, Shizuoka (JP); Takahiro Wakuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/330,854

(22) PCT Filed: Sep. 5, 2017

(86) PCT No.: PCT/JP2017/031960
§ 371 (c)(1),
(2) Date: Mar. 6, 2019

(87) PCT Pub. No.: WO2018/047820
PCT Pub. Date: Mar. 15, 2018

(65) Prior Publication Data
US 2019/0219102 A1 Jul. 18, 2019

(30) Foreign Application Priority Data
Sep. 8, 2016 (JP) .................. 2016-175612

(51) Int. Cl.
*F16C 33/76* (2006.01)
*F16C 33/78* (2006.01)

(52) U.S. Cl.
CPC ...... *F16C 33/7823* (2013.01); *F16C 33/7843* (2013.01); *F16C 2361/65* (2013.01)

(58) Field of Classification Search
CPC .. F16C 19/06; F16C 33/7823; F16C 33/7843; F16J 15/3408; F16J 15/3428; F16J 15/3432
See application file for complete search history.

(56) References Cited

U.S. PATENT DOCUMENTS 3,022,081 A * 2/1962 Kosatka ............... F16J 15/3256
277/353
5,269,536 A * 12/1993 Matsushima ........ F16J 15/3256
277/349

(Continued)

FOREIGN PATENT DOCUMENTS

EP     3 269 989     1/2018
FR     2636691       3/1990

(Continued)

OTHER PUBLICATIONS

Extended European Search Report dated Jul. 18, 2019 in European Application No. 17848760.9.

(Continued)

*Primary Examiner* — Phillip A Johnson
(74) *Attorney, Agent, or Firm* — Wenderoth, Lind & Ponack, L.L.P.

(57) ABSTRACT

A sealed bearing includes an inner race; and seal members each including a seal lip made of rubber. Each seal lip includes a plurality of protrusions circumferentially spaced apart from each other, and kept in sliding contact with the inner race with fluid lubrication condition generated between the protrusions and the inner race. Each protrusion has a circular arc-shaped cross section along the circumferential direction, and the circular arc-shaped cross section has a radius of 0.4 mm or more and less than 9.0 mm.

8 Claims, 7 Drawing Sheets

(56) References Cited

U.S. PATENT DOCUMENTS

| | | | |
|---|---|---|---|
| 5,759,466 A | 6/1998 | Onuma et al. | |
| 9,150,226 B2 * | 10/2015 | Rode | F16J 15/0887 |
| 9,291,272 B2 * | 3/2016 | Lattime | F16J 15/3256 |
| 9,765,822 B2 * | 9/2017 | Kanamoto | F16J 15/3276 |
| 2018/0045247 A1 | 2/2018 | Inamasu et al. | |

FOREIGN PATENT DOCUMENTS

| | | | |
|---|---|---|---|
| JP | 08254213 A * | 10/1996 | F16C 33/7823 |
| JP | 09-042463 | 2/1997 | |
| JP | 2002-327761 | 11/2002 | |
| JP | 2013-002564 | 1/2013 | |
| JP | 2013-209997 | 10/2013 | |

OTHER PUBLICATIONS

International Search Report dated Dec. 5, 2017 in International (PCT) Application No. PCT/JP2017/031960.

International Preliminary Report on Patentability dated Mar. 12, 2019 in International (PCT) Application No. PCT/JP2017/031960, with English-language translation.

* cited by examiner

SEALED BEARING

TECHNICAL FIELD

The present invention relates to a sealed bearing including seal members between its inner and outer races.

BACKGROUND ART

Generally, rolling bearings are used in rotary portions of automobiles' transmissions, differentials, constant velocity joints, propeller shafts, turbochargers, hubs, etc., or in rotary portions of machine tools, wind power generators, etc. Such rolling bearings include an inner race; an outer race disposed radially outwardly of, and coaxially with, the inner race; and a plurality of rolling elements disposed in the annular space defined between the inner race and the outer race.

Such a rolling bearing in an automotive transmission or an automotive differential is used in an environment where there is lubricating oil, and the lubricating oil frequently contains foreign matter such as gear wear dust. If such gear wear dust enters the bearing, the bearing may break at an early stage.

In order to prevent the entry of foreign matter such as gear wear dust, sealed bearings (as disclosed in Japanese Unexamined Patent Application Publication No. 2002-327761) are generally used as rolling bearings in an automotive transmission, an automotive differential, etc. Such a sealed bearing includes annular seal members closing the openings of the annular space defined between the inner and outer races at the respective ends of the annular space. Each annular seal member includes a seal lip made of rubber, and generally kept in sliding contact with the outer periphery of the inner race over the entire circumference thereof.

PRIOR ART DOCUMENTS

Patent Documents

Patent document 1: Japanese Unexamined Patent Application Publication No. 2002-327761

SUMMARY OF THE INVENTION

Problems to be Solved by the Invention

In such a sealed bearing, since the seal lips of the seal members are in sliding contact with the inner race, when the inner and outer races rotate relative to each other, rotational resistance (hereinafter referred to as the "seal torque") is generated due to the sliding contact of the seal lips. This seal torque is preferably as small as possible for higher transmission efficiency of the transmission, differential, etc. Especially since higher fuel efficiency is required for today's automobiles, it is important to further reduce the seal torque of sealed bearings used in a transmission, a differential, etc.

Also, with such a sealed bearing, since the seal lips of the seal members are in sliding contact with the inner race, the temperature of the bearing tends to rise excessively due to the frictional heat generated between the seal lips and the inner race.

It is an object of the present invention to provide a sealed bearing of which the seal torque is small, and of which the temperature is less likely to rise excessively.

Means for Solving the Problems

In order to achieve the above object, the present invention provides a sealed bearing comprising: an inner race; an outer race disposed radially outwardly of, and coaxially with, the inner race; a plurality of rolling elements disposed in an annular space defined between the inner race and the outer race so as to be spaced apart from each other in a circumferential direction; and an annular seal member closing an opening of the annular space at an end of the annular space. The annular seal member includes a seal lip made of rubber, wherein the seal lip includes a plurality of protrusions spaced apart from each other in the circumferential direction, and in sliding contact with one of the inner race and the outer race with fluid lubrication condition generated between the protrusions and the one of the inner race and the outer race. Each of the protrusions has a circular arc-shaped cross section along the circumferential direction, and the circular arc-shaped cross section having a radius of 0.4 mm or more and less than 9.0 mm.

With this arrangement, since each protrusion of the seal lip has a circular arc-shaped cross section along the circumferential direction, and the circular arc-shaped cross section has a radius of 0.4 mm or more and less than 9.0 mm, when the protrusions and the one of the inner race and the outer race circumferentially move relative to each other, lubricating oil is effectively introduced along the surfaces of the protrusions into the sliding contact portions of the protrusions and the one of the inner race and the outer race. At this time, due to the wedge film effect, it is possible to generate fluid lubrication condition between the sliding portions, and thus to dramatically reduce the rotational resistance (seal torque) of the bearing due to sliding contact of the seal lip. Also, less frictional heat is produced between the seal lip and the one of the inner race and the outer race, and thus the temperature of the bearing is less likely to rise excessively.

There are two types of lubrication conditions, namely boundary lubrication condition and fluid lubrication condition. The boundary lubrication condition means the condition in which friction surfaces are lubricated by an oil film comprising several molecular layers (about $10^{-5}$ to $10^{-6}$ mm thick) of lubricating oil adsorbed on the friction surfaces such that minute protrusions and recesses of the frictional surfaces are in direct contact with each other. The fluid lubrication condition means the condition in which a fluid film of lubricating oil (e.g., about $10^{-3}$ to $10^{-1}$ mm in thickness) is formed on two friction surfaces by a hydrodynamic principle such that the two friction surfaces are not in direct contact with each other. Since, when fluid lubricating condition is generated due to the generation of the wedge film effect, the sliding resistance of the seal member becomes substantially zero, the seal member can be used at a high peripheral speed, which was impossible with conventional seals.

The protrusions are preferably arranged at pitches of 0.2 mm or more and 3.0 mm or less in the circumferential direction.

By arranging the protrusions at circumferential pitches of 3.0 mm or less, it is possible, under general bearing use conditions, to ensure appropriate oil film thickness between the protrusions of the seal lip and the one of the inner race and the outer race, and thus to effectively generate the wedge film effect. Also, by arranging the protrusions at circumferential pitches of 0.2 mm or more, it is possible to reduce the manufacturing costs of a mold for manufacturing the seal lip.

Each of the protrusions preferably has a height of 0.01 mm or more and less than 0.10 mm.

If the height of each of the protrusions is set at 0.01 mm or more, it is possible to effectively generate the wedge film effect under general bearing use conditions. Also, if the height of each of the protrusions is set at less than 0.10 mm, it is possible to effectively prevent foreign objects from entering the bearing.

It is especially suitable that the above-described sealed bearing is used as a rolling bearing rotatably supporting a rotary shaft of an automotive transmission.

Effects of the Invention

In the sealed bearing of the present invention, since each protrusion of the seal lip has a circular arc-shaped cross section along the circumferential direction, and the circular arc-shaped cross section has a radius of 0.4 mm or more and less than 9.0 mm, when the protrusions and the one of the inner race and the outer race circumferentially move relative to each other, lubricating oil is effectively introduced along the surfaces of the protrusions into the sliding contact portions of the protrusions and the one of the inner race and the outer race. At this time, due to the wedge film effect, it is possible to generate fluid lubrication condition between the sliding portions, and thus to dramatically reduce the rotational resistance (seal torque) of the bearing due to the sliding contact of the seal lip. Also, less frictional heat is produced between the seal lip and the one of the inner race and the outer race, and thus the temperature of the bearing is less likely to rise excessively.

BEST MODE FOR CARRYING OUT THE INVENTION

Figure 1:
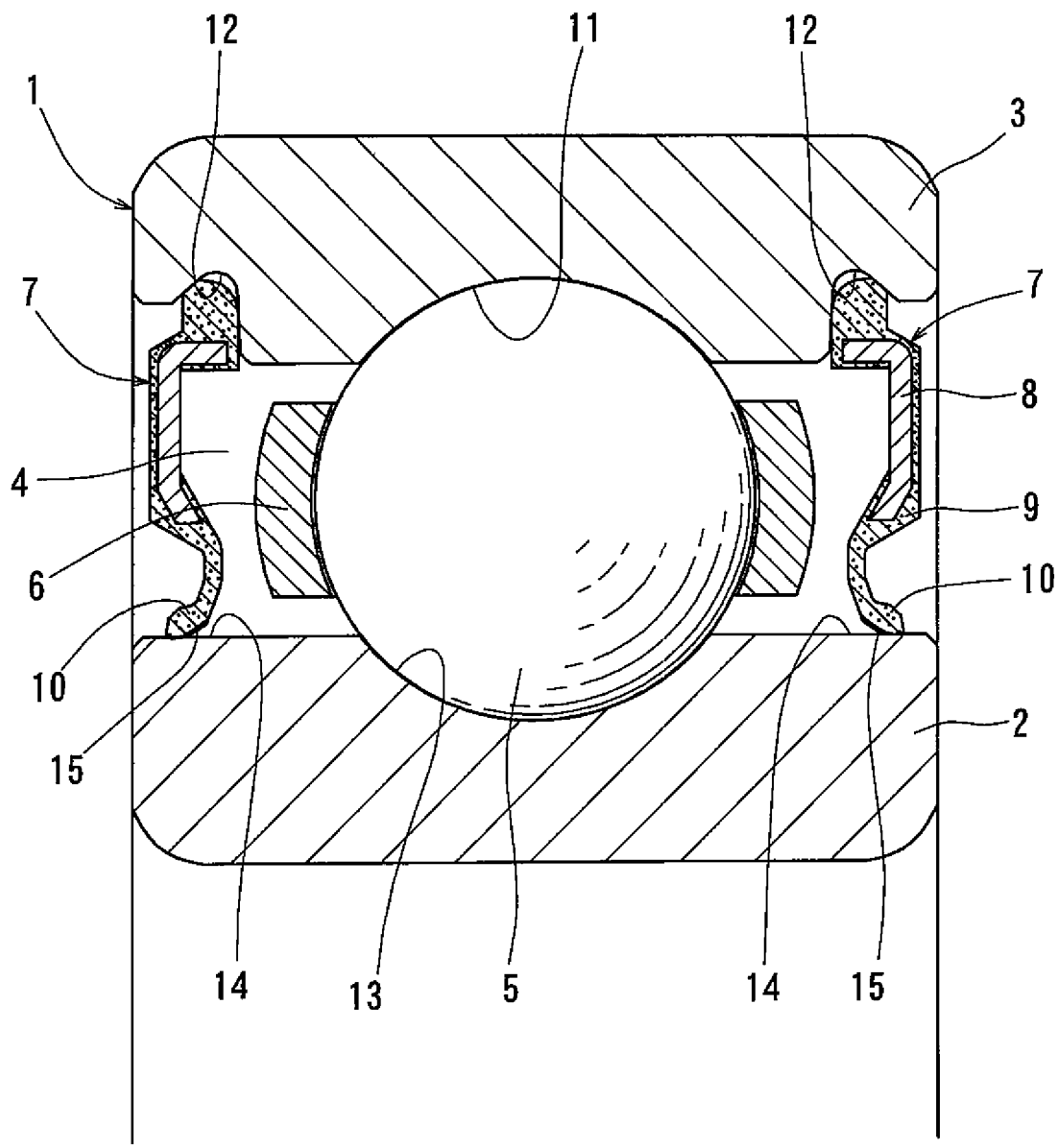
FIG. 1 is a sectional view of a sealed bearing embodying the present invention.

FIG. 1 illustrates a sealed bearing 1 embodying the present invention. The sealed bearing 1 includes an inner race 2; an outer race 3 disposed radially outwardly of, and coaxially with, the inner race 2; a plurality of balls 5 disposed in an annular space 4 defined between the inner race 2 and the outer race 3 so as to be circumferentially spaced apart from each other; a retainer 6 retaining the balls 5 to keep them circumferentially spaced apart from each other; and a pair of annular seal members 7 closing the respective axial openings of the annular space 4 at both ends thereof.

Each seal member 7 is an annular member comprising an annular metal core 8; and a rubber (such as nitrile rubber) part 9 bonded to the surface of the metal core 8 when forming the rubber part 9 by vulcanization. Each seal member 7 includes a seal lip 10 disposed at the radially inner edge portion of the seal member 7. The seal lip 10 is a portion of the rubber part 9 extending radially inwardly from the radially inner edge of the metal core 8, and thus is made of rubber.

The outer race 3 includes a raceway groove 11 circumferentially extending on the inner periphery of the outer race 3; and seal fixing grooves 12 circumferentially extending on the respective axial ends of the inner periphery of the outer race 3 such that the raceway groove 11 is located axially between the seal fixing grooves 12. The balls 5 can roll on the raceway groove 11 while kept in rolling contact with the inner surface of the raceway groove 11. The radially outer edges of the seal members 7 are fixedly fitted in the respective seal fixing grooves 12.

The inner race 2 includes a raceway groove 13 circumferentially extending on the outer periphery of the inner race 2; and seal sliding surfaces 14 circumferentially extending on the respective axial ends of the outer periphery of the inner race 2 such that the raceway groove 13 is located axially between the seal sliding surfaces 14. The balls 5 can roll on the raceway groove 13 while kept in rolling contact with the inner surface of the raceway groove 13. The seal lips 10 of the seal members 7 are in sliding contact with the respective seal sliding surfaces 14. The seal sliding surfaces 14 are shown as cylindrical surfaces, but may be conical surfaces (e.g., conical side surfaces of seal sliding grooves formed in the outer periphery of the inner race 2 such that the seal lips 10 are in sliding contact with these side surfaces).

Figure 2:
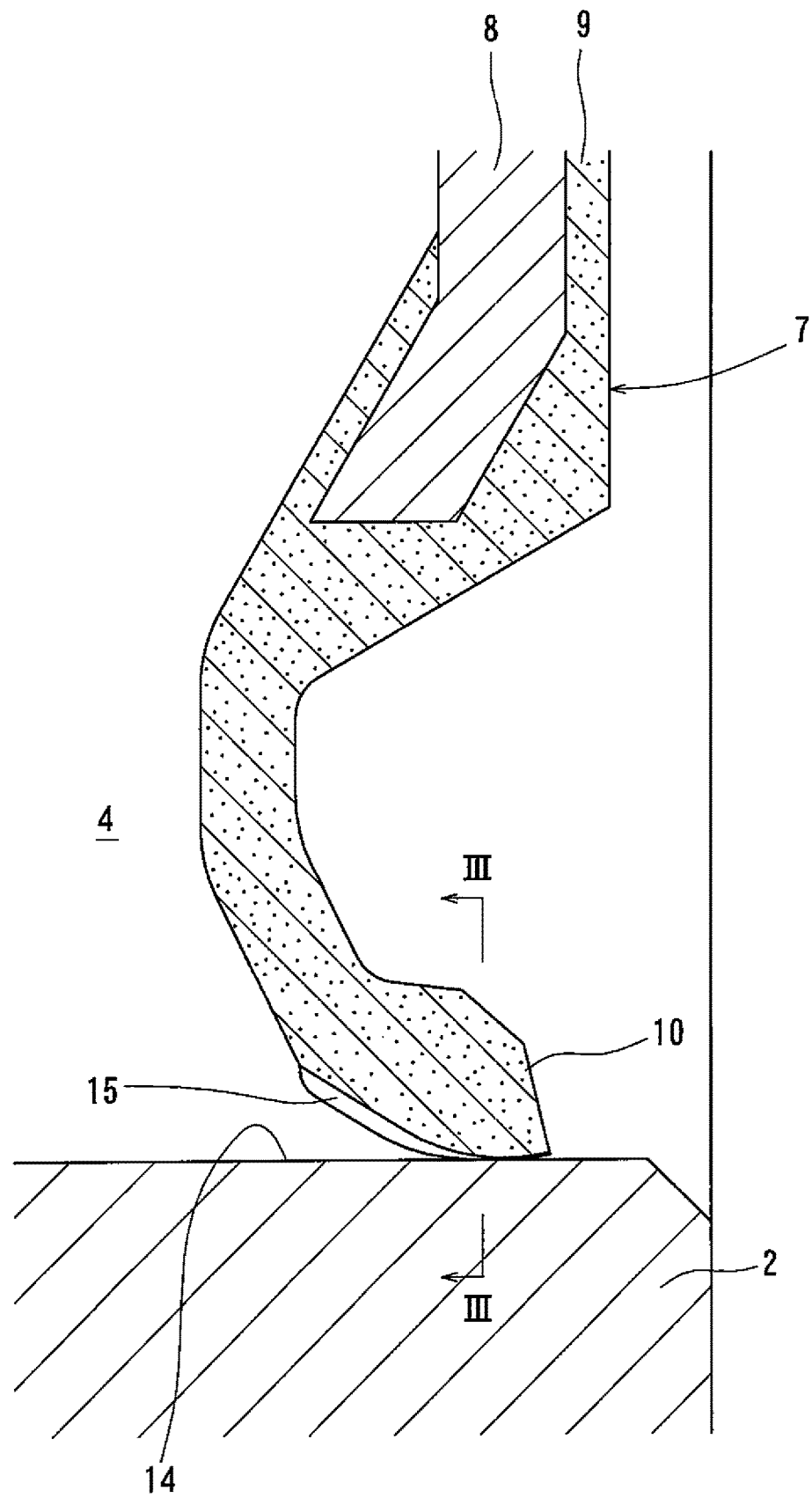
FIG. 2 is an enlarged sectional view illustrating a seal lip of FIG. 1 and its vicinity.
Figure 3:
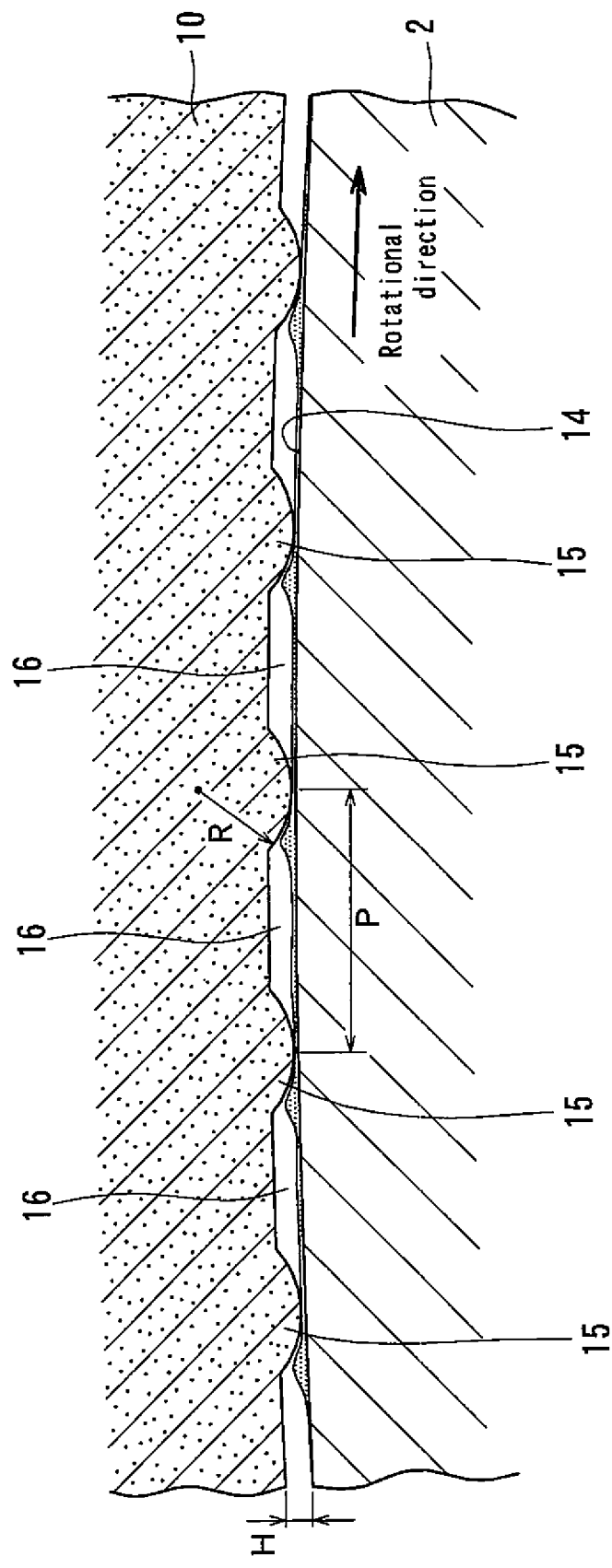
FIG. 3 is a sectional view taken along line III-III of FIG. 2.

As illustrated in FIGS. 2 and 3, the seal lip 10 (of each seal member) includes, on its radially inner edge, a plurality of protrusions 15 circumferentially spaced apart from each other, and kept in sliding contact with the corresponding seal sliding surface 14 of the inner race 2. The protrusions 15 are formed on the surface (radially inwardly facing surface in the example shown) of the seal lip 10 opposed to the seal sliding surface 14 so as to be elongated in the directions orthogonal to the circumferential direction.

As illustrated in FIG. 3, each protrusion 15 has a circular arc-shaped cross section along the circumferential direction, and the circular arc-shaped cross section has a radius R of 0.4 mm or more and less than 9.0 mm (preferably 0.4 mm or more and 6.0 mm or less, more preferably 0.4 mm or more and 3.0 mm or less). The height H of each protrusion 15 is smaller than the radius R of the circular arc-shaped cross section of the protrusion 15, and is 0.01 mm or more and less than 0.10 mm (preferably 0.01 mm or more and 0.08 mm or less, more preferably 0.01 mm or more and 0.05 mm or less). The protrusions 15 are circumferentially arranged at circumferential pitches P of are 0.2 mm or more and 3.0 mm or less (preferably 0.2 mm or more and 1.5 mm or less). The "(circular arc-shaped) cross section of each protrusion 15 along the circumferential direction" means the cross section of the protrusion 15 taken along a plane orthogonal to the seal sliding surface 14, and extending in the circumferential direction.

Figure 4:
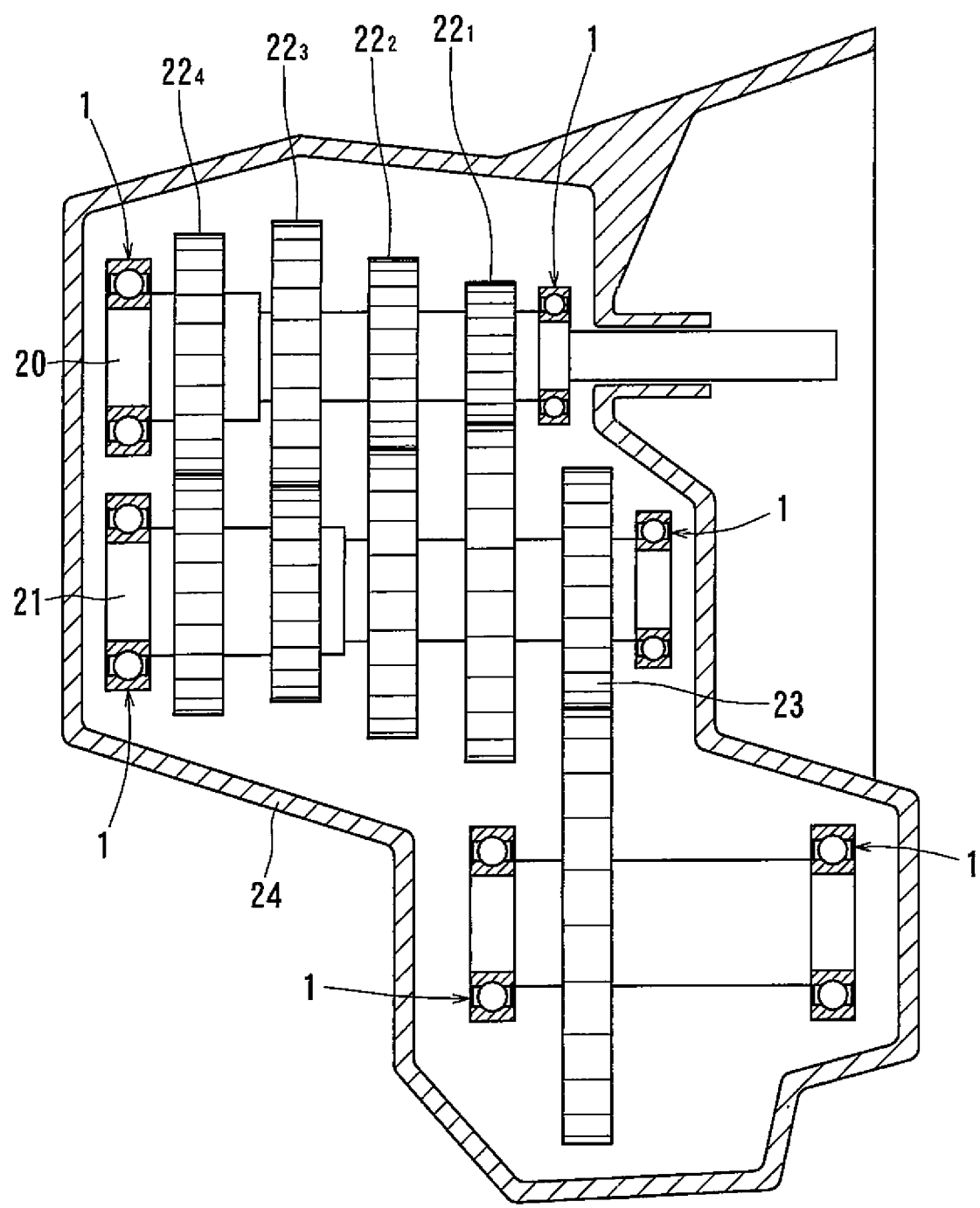
FIG. 4 is a sectional view schematically illustrating the state in which sealed bearings as illustrated in FIG. 1 are used as rolling bearings rotatably supporting rotary shafts of an automotive transmission.

As illustrated in FIG. 4, such sealed bearings 1 can be used as rolling bearings rotatably supporting rotary shafts (input and output shafts 20 and 21 in the shown example) of the transmission of an automobile. The transmission of FIG. 4 includes the input shaft 20, to which the rotation of the engine of the automobile is transmitted; the output shaft 21 extending parallel to the input shaft 20; a plurality of gear trains $22_1$ to $22_4$ through which the rotation of the input shaft 20 is transmitted to the output shaft 21; and clutches (not shown) mounted between the input shaft 20 and the respective gear trains $22_1$ to $22_4$, or between the output shaft 21 and the respective gear trains $22_1$ to $22_4$. By selectively engaging the respective clutches, the rotation of the input shaft 20 is transmitted through the respective gear trains $22_1$ to $22_4$ to the output shaft 21 in different gear ratios. The rotation of the output shaft 21 is transmitted to an output gear 23, and the rotation of the output gear 23 is transmitted to e.g., a differential of the automobile. As mentioned above, each of the input and output shaft 20 and 21 is rotatably supported by some of the sealed bearings 1 according to the present invention. The shown transmission is configured such that the lateral sides of each sealed bearing 1 are supplied with transmission oil injected from nozzles located within a housing 24 of the transmission, or splashed due to the rotation of the output gear 23.

The sealed bearing 1 of this embodiment is configured such that lubricating oil (transmission oil) supplied from the outside of the bearing flows into gaps 16 (see FIG. 3) defined between the respective circumferentially adjacent pairs of protrusions 15, and lubricates the opposed portions of the seal lip 10 and the inner race 2. Since, as illustrated in FIG. 3, each protrusion 15 of the seal lip 10 has a circular arc-shaped cross section along the circumferential direction, and the circular arc-shaped cross section has a radius R of 0.4 mm or more and less than 9.0 mm, when the seal sliding surface 14 on the outer periphery of the inner race 2 circumferentially moves relative to the protrusions 15, lubricating oil is effectively introduced along the surfaces of the protrusions 15 into the sliding contact portions of the protrusions 15 and the inner race 2. At this time, due to the wedge film effect, fluid lubrication condition is generated between the sliding contact portions of the protrusions 15 of the seal lip 10 and the inner race 2. This dramatically reduces the rotational resistance (seal torque) of the bearing due to sliding contact of the seal lip 10.

Since the seal torque of the sealed bearing 1 according to this embodiment is small, less frictional heat is produced between the inner race 2 and the seal lip 10 of each seal member 7. Also, since lubricating oil (transmission oil) supplied from the outside passes between the inner race 2 and the seal lip 10, i.e., flows through the gaps 16 (see FIG. 3) between the respective circumferentially adjacent pairs of protrusions 15, it is possible to release or radiate frictional heat between the inner race 2 and the seal lip 10, and thus to very effectively prevent the temperature of the bearing from rising excessively.

With this sealed bearing 1, since the circumferential pitches P of the protrusions 15 are 3.0 mm or less (preferably 1.5 mm or less), it is possible, under general bearing use conditions, to ensure appropriate oil film thickness between the inner race 2 and the protrusions 15 of the seal lip 10, and thus to effectively generate the wedge film effect. Also, since the circumferential pitches P of the protrusions are 0.2 mm or more, it is possible to reduce the manufacturing costs of a mold for manufacturing the seal lip 10.

With this sealed bearing 1, since each protrusion 15 has a height H of 0.01 mm or more, it is possible to effectively generate the wedge film effect under general bearing use conditions, and further to reliably form the protrusions 15 when the seal lip 10 is manufactured by use of a mold. Also, since each protrusion 15 has a height H of less than 0.10 mm (preferably 0.08 mm or less, more preferably 0.05 mm or less), it is possible to effectively prevent foreign objects from entering the bearing.

In order to confirm that the sealed bearing 1 according to the embodiment of the present invention is much smaller in seal torque than bearings including conventional contact seals, the inventors of the present application prepared bearing samples of Comparative Examples 1 and 2, and Examples 1 to 3, and conducted an experiment to measure the torque of these bearing samples.

The specifications of the respective bearing samples are as follows:

Comparative Example 1

The bearing sample of Comparative Example 1 is a sealed bearing including ordinary contact seals (seal members each having a seal lip kept in contact with the inner race with no gap defined therebetween over the entire circumference of the inner race).

Comparative Example 2

The bearing sample of Comparative Example 2 is a sealed bearing including ordinary non-contact seals (seal members kept out of contact with the inner race over the entire circumference thereof).

Example 1

The bearing sample of Example 1 is a sealed bearing 1 according to the above embodiment in which each protrusion 15 has a circular arc-shaped cross section having a radius R of 1.5 mm, and has a height H of 0.04 mm; and the protrusions 15 are arranged circumferentially at circumferential pitches P of 0.4 mm.

Example 2

The bearing sample of Example 2 is a sealed bearing 1 according to the above embodiment in which each protrusion 15 has a circular arc-shaped cross section having a radius R of 1.0 mm, and has a height H of 0.04 mm; and the protrusions 15 are arranged at circumferential pitches P of 1.1 mm.

Example 3

The bearing sample of Example 3 is a sealed bearing 1 according to the above embodiment in which each protrusion 15 has a circular arc-shaped cross section having a-radius R of 1.0 mm, and has a height H of 0.04 mm; and the protrusions 15 are arranged at circumferential pitches P of 0.5 mm.

Figure 5:
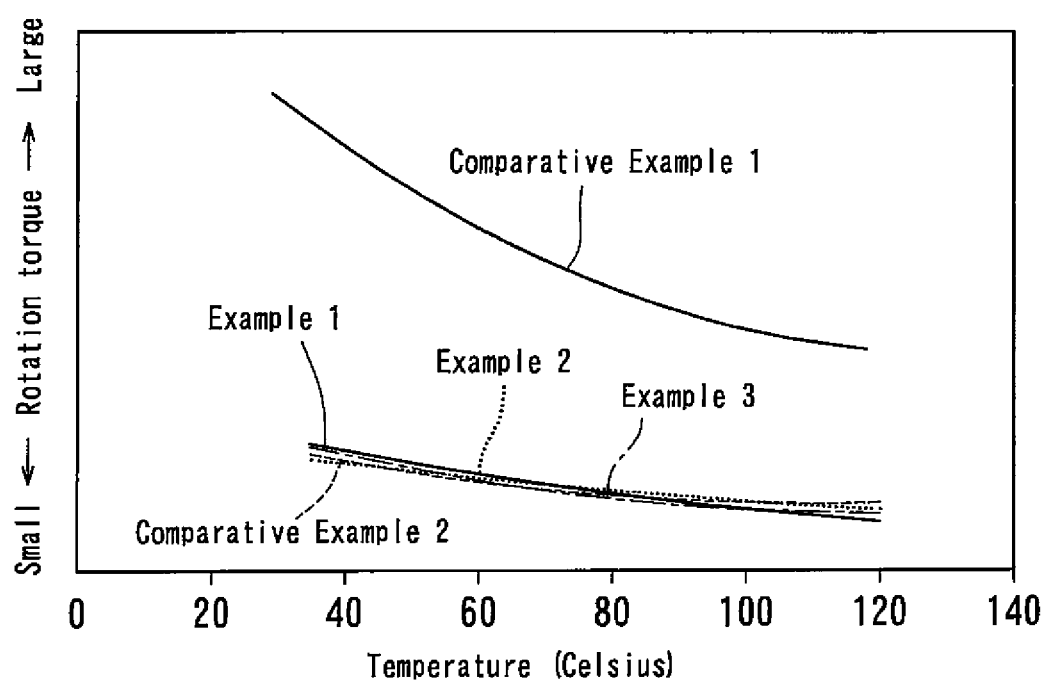
FIG. 5 is a graph showing the results of an experiment conducted to measure the torque of Comparative Example 1 (bearing with ordinary contact seals); Comparative Example 2 (bearing with ordinary non-contact seals); and Examples 1 to 3 (sealed bearings according to the embodiment of the present invention).

The experimental conditions were as follows:
Seal peripheral speed: 2.51 m/s (1500 rpm)
Temperature: normal temperature to 120 degrees Celsius FIG. 5 illustrates the results of the experiment. As shown, the bearing torque values of Examples 1 to 3 are much smaller than the bearing torque value of Comparative Example 1, and substantially equal to the bearing torque value of Comparative Example 2. Thus, the experiment results indicate that, despite the fact that the sealed bearing 1 according to the above embodiment uses contact seals, which are higher in seal performance than non-contact seals, the seal torque of the sealed bearing 1 according to the embodiment of the present invention is extremely small compared with bearings with ordinary contact seals, and substantially equal to that of bearings including non-contact seals.

In order to confirm that, by using the sealed bearing 1 according to the embodiment of the present invention, it is possible to effectively generate fluid lubrication condition between the sliding contact portions of the inner race 2 and the seal lip 10 (of each seal member), the inventors of the present application prepared a plurality of sealed bearing samples of which the protrusions 15 had circular arc-shaped cross sections having different radii R from the protrusions 15 of the other sealed bearing samples, and conducted an experiment to measure the seal torque of these samples.

Figure 6:
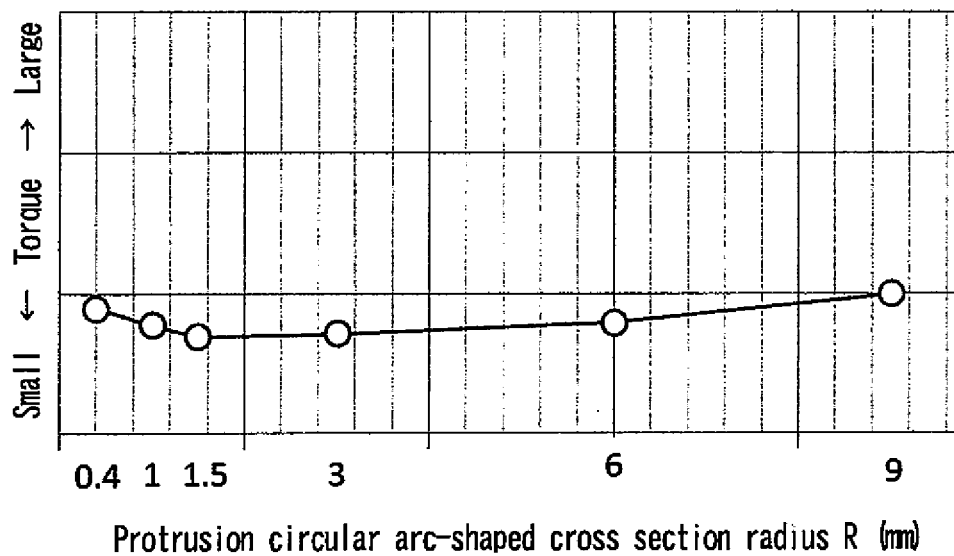
FIG. 6 is a graph illustrating the relationship, for each of sealed bearing samples embodying the present invention, between the radius R of a circular arc-shaped cross section of each of protrusions and the seal torque.

The experimental conditions were as follows:
Height H of the protrusions 15: 0.05 mm
Seal peripheral speed: 2.51 m/s (1500 rpm)
Lubricating oil: CVTE, 120 degrees Celsius FIG. 6 illustrates the results of the experiment. As shown, the seal torque is very effectively reduced in the sealed bearings of which the protrusions 15 have circular arc-shaped cross sections having radii R of 0.4 mm or more and less than 9.0 mm (preferably 0.4 mm or more and 6.0 mm or less, more preferably 0.4 mm or more and 3.0 mm or less). This indicates that if the circular arc-shaped cross section of each protrusion 15 has a radius R of 0.4 mm or more and less than 9.0 mm, fluid lubrication condition is generated between the sliding contact portions of the inner race 2 and the respective seal lips 10.

Furthermore, in order to confirm that, when the protrusions 15 are arranged at circumferential pitches P of 0.2 mm or more and 3.0 mm or less (preferably 0.2 mm or more and 1.5 mm or less), the seal torque is very effectively reduced, the inventors of the present application prepared a plurality of sealed bearing samples 1 of which the protrusion 15 are arranged at different circumferential pitches P from each other, and conducted an experiment to measure the seal torque of these samples.

Figure 7:
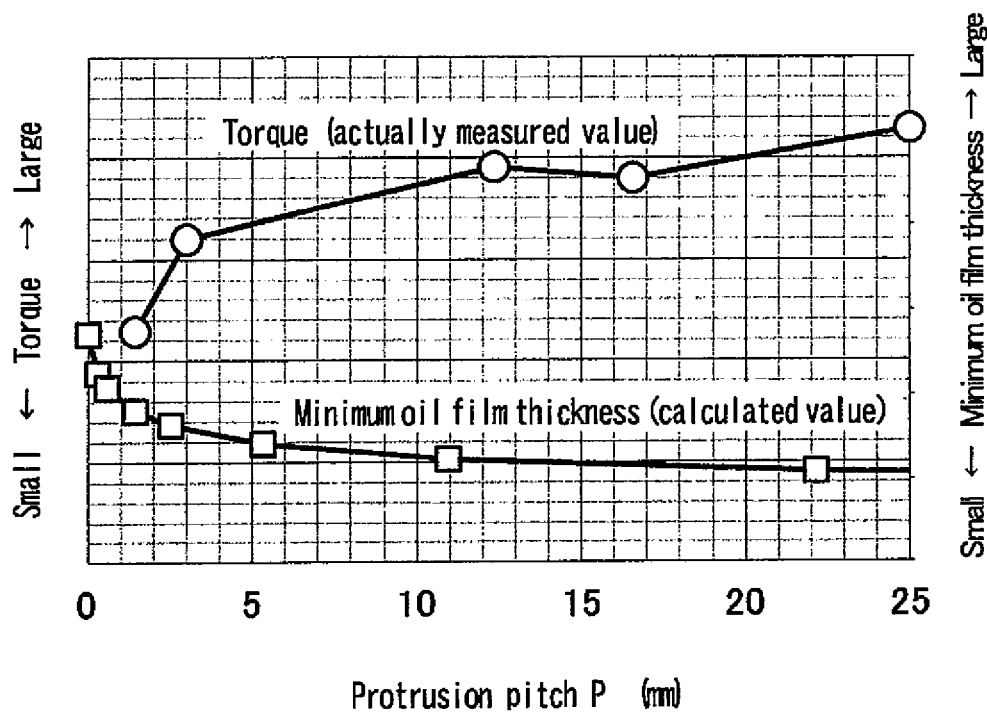
FIG. 7 is a graph illustrating the relationship, for each of sealed bearing samples embodying the present invention, between the circumferential pitches P of the protrusions and the seal torque.

The experimental conditions were as follows:
Height H of the protrusions 15: 0.05 mm
Seal peripheral speed: 2.51 m/s (1500 rpm)
Lubricating oil: CVTE, 120 degrees Celsius FIG. 7 illustrates the results of the experiment. The experimental results indicate that, when the protrusions 15 were arranged at circumferential intervals P of 0.2 mm or more and 3.0 mm or less (preferably 0.2 mm or more and 1.5 mm or less), a thick oil film forms due to the wedge film effect, and thus the seal torque is very effectively reduced.

In order to confirm that, when each protrusion 15 has a height H of 0.01 mm or more and less than 0.10 mm (preferably 0.01 mm or more and 0.08 mm or less, more preferably 0.01 mm or more and 0.05 mm or less), high bearing seal performance can be ensured, the inventors of the present application prepared a plurality of sealed bearing samples 1 of which the protrusions 15 have different heights H from the protrusions 15 of the other sealed bearing samples, and conducted an experiment to measure the particle diameter distribution of foreign objects entering these bearing samples.

Figure 8:
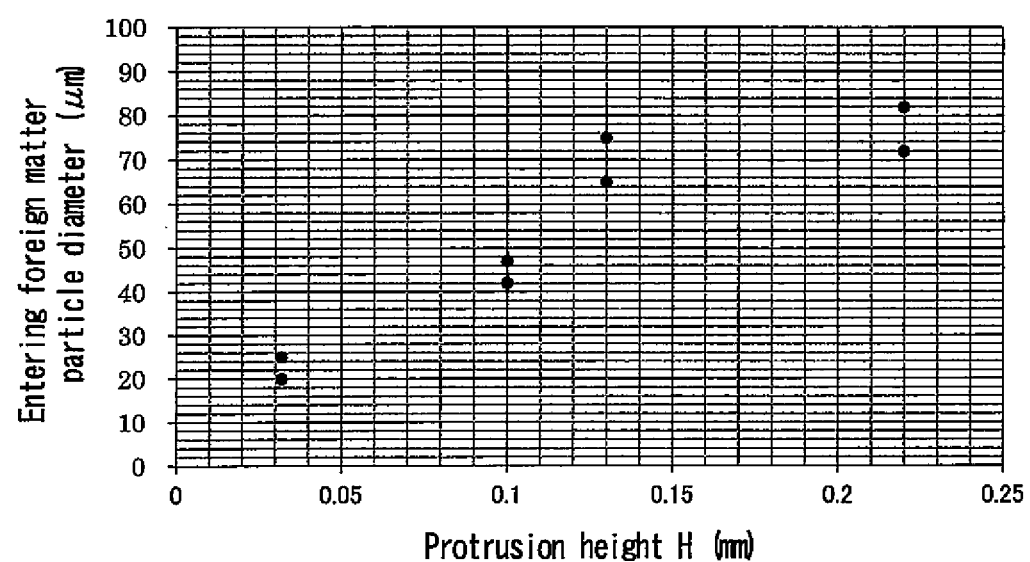
FIG. 8 is a graph illustrating the relationship, for each of sealed bearing samples embodying the present invention, between the heights H of the protrusions and the particle diameters of foreign objects entering the bearing.

FIG. 8 illustrates the results of the experiment. The experimental results indicate that, when each protrusion 15 has a height H of 0.01 mm or more and less than 0.10 mm (preferably 0.01 mm or more and 0.08 mm or less, more preferably 0.01 mm or more and 0.05 mm or less), it is possible to prevent the entry of foreign objects having particle diameters of more than 50 µm.

The inventors of the present application also investigated, if the lubricating oil in the interior of a rolling bearing contains foreign objects, the relationship between the particle diameters of such foreign objects and the life of the rolling bearing. This investigation revealed that, while, generally speaking, the larger the particle diameters of the foreign objects in the lubricating oil in the interior of the rolling bearing, the shorter the life of the rolling bearing tends to be, if the foreign objects contained in the lubricating oil in the interior of the rolling bearing have particle diameters of 50 µm or less, the life ratio of the rolling bearing (ratio of its actual life to calculated life) is sufficient for actual use in an automotive transmission (for example, about 7 to 10).

Therefore, it is possible to ensure high seal performance in a bearing in which the protrusion height H is set at 0.01 mm or more and less than 0.10 mm (preferably 0.01 mm or more and 0.08 mm or less, more preferably 0.01 mm or more and 0.05 mm or less), especially when actually used in an automotive transmission.

While, in the above embodiment, a bearing is exemplified in which the inner race is rotatable (with the seal members 7 fixed to the outer race 3, and the seal lips 10 formed at the radially inner edges of the seal members 7 so as to be in sliding contact with the inner race 2), the present invention can be also applied to a bearing in which the outer race is rotatable (with the seal members 7 fixed to the inner race 2, and the seal lips 10 formed at the radially outer edges of the seal members 7 so as to be in sliding contact with the outer race 3).

Also, while, in the above embodiment, sealed bearings 1 are used as rolling bearings rotatably supporting rotary shafts of an automotive transmission, the present invention can be also applied to sealed bearings used for rotary portions of an automobile's differential, constant velocity joint, propeller shaft, turbocharger, hub, etc., or in rotary portions of a machine tool, a wind power generator, etc.

Also, while, in the above embodiment, a bearing is exemplified in which the balls 5 are used as its rolling elements, the present invention can be also applied to a bearing in which cylindrical rollers or tapered rollers are used as its rolling elements.

Also, while, in the above embodiment, a sealed bearing 1 is exemplified in which two seal members 7 are disposed at the respective ends of the annular space 4, the present invention is also applicable to a sealed bearing having only one seal member 7 at one end of the annular space 4.

The above-described embodiment is merely an example in every respect, and the present invention is not limited to the above embodiment. The scope of the present invention is indicated not by the above description but by the claims, and should be understood to include all modifications within the scope of the claims and the meaning equivalent to the scope of the claims.

DESCRIPTION OF REFERENCE NUMERALS

1: sealed bearing
2: inner race
3: outer race
4: annular space
5: ball
7: seal member
10: seal lip
15: protrusion 20: input shaft
21: output shaft
R: radius
H: height
P: pitch

The invention claimed is:

1. A sealed bearing comprising:
an inner race;
an outer race radially outwardly of, and coaxially with, the inner race;
a plurality of rolling elements in an annular space defined between the inner race and the outer race so as to be spaced apart from each other in a circumferential direction; and
an annular seal member closing an axial opening of the annular space at an axial end of the annular space;
wherein the annular seal member includes a seal lip made of rubber,
wherein the seal lip includes a plurality of protrusions spaced apart from each other in the circumferential direction, and in sliding contact with one of the inner race and the outer race with fluid lubrication condition generated between the protrusions and the one of the inner race and the outer race, and
wherein each of the protrusions has a circular arc-shaped cross section along the circumferential direction, the circular arc-shaped cross section having a radius of 0.4 mm or more and less than 9.0 mm.

2. The sealed bearing according to claim 1, wherein the protrusions are arranged at pitches of 0.2 mm or more and 3.0 mm or less in the circumferential direction.

3. The sealed bearing according to claim 2, wherein each of the protrusions has a height of 0.01 mm or more and less than 0.10 mm.

4. The sealed bearing according to claim 3, wherein the sealed bearing is a rolling bearing for rotatably supporting a rotary shaft of an automotive transmission.

5. The sealed bearing according to claim 2, wherein the sealed bearing is a rolling bearing for rotatably supporting a rotary shaft of an automotive transmission.

6. The sealed bearing for according to claim 1, wherein each of the protrusions has a height of 0.01 mm or more and less than 0.10 mm.

7. The sealed bearing according to claim 6, wherein the sealed bearing is a rolling bearing for rotatably supporting a rotary shaft of an automotive transmission.

8. The sealed bearing according to claim 1, wherein the sealed bearing is a rolling bearing for rotatably supporting a rotary shaft of an automotive transmission.

* * * * *